March 15, 1949. H. GERING 2,464,746
METHOD OF MANUFACTURING THERMOPLASTIC PELLETS
Filed Oct. 17, 1946
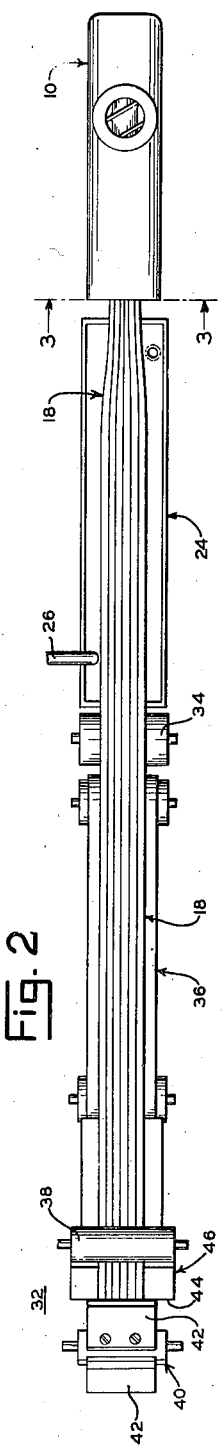
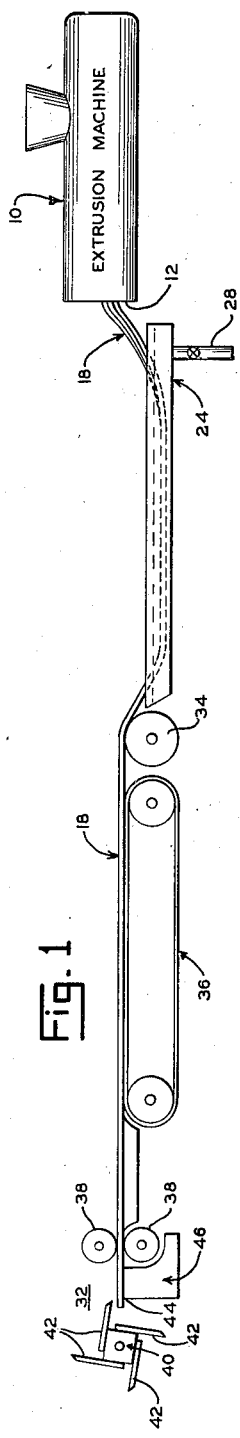
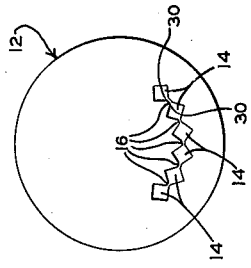
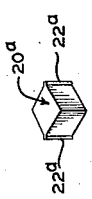
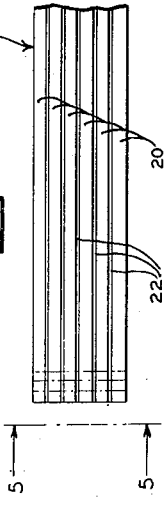
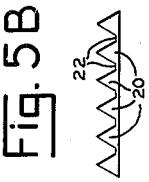
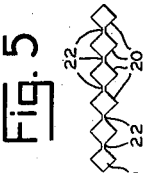
INVENTOR
HERMAN GERING
BY Harry Cohn
ATTORNEY Patented Mar. 15, 1949

2,464,746

UNITED STATES PATENT OFFICE 2,464,746

METHOD OF MANUFACTURING THERMOPLASTIC PELLETS

Herman Gering, Newark, N. J., assignor to Gering Products, Inc., Kenilworth, N. J., a corporation of New Jersey Application October 17, 1946, Serial No. 703,822

4 Claims. (Cl. 18—55)

The present invention relates to the manufacture of pellets of thermoplastic material.

One object of this invention is generally to provide an improved method of producing thermoplastic pellets, particularly in respect to efficient production, the uniformity of pellet size, and the usefulness of the method for manufacturing pellets from any normally solid thermoplastic material.

Another object of the invention is the provision of a method of manufacturing thermoplastic pellets in a continuous process in which a plurality of slender rods of the thermoplastic material are extruded simultaneously in such relation as to prevent tangling of the extruded rods during the travel thereof from the outlet of the extrusion apparatus to the pelletizing means.

The above and other objects, features and advantages of the present invention will be fully understood from the following description considered in connection with the accompanying drawings which are to be considered as illustrative of the invention but not in limitation thereof.

In the drawings:

Fig. 1 is a side view of apparatus embodying the present invention and is illustrative of the method;

Fig. 2 is a top plan view thereof;

Fig. 3 is a view of the die plate, as seen from the line 3—3 of Fig. 2;

Fig. 4 is a plan view of part of an extruded web of thermoplastic material, as a step product embodying the invention;

Fig. 5 is an end view of the web, as seen from the line 5—5 of Fig. 4;

Fig. 6 is a perspective view, on an enlarged scale, of one of the pellets;

Figs. 5A and 5B are views similar to Fig. 5 showing other forms.

In accordance with the present invention, there is utilized an extrusion machine 10 in which the plastic is heated and from which the heat-softened plastic is extruded. As supplied to the extrusion machine, the thermoplastic material may be in any suitable form but is preferably granular or in the form of small pieces. Except as hereinafter described, the extrusion machine may be of any standard or conventional construction.

In performing the method of the present invention, the extrusion machine 10 is provided with a die plate 12 which in accordance with this invention is provided with a plurality of openings 14 disposed laterally of each other in close relation. Said die plate is also provided with short slit-like openings 16 which connect adjacent openings 14 to each other.

As a result of the provision of the slit-connected laterally arranged openings 14 in the die plate 12, the plastic material is extruded in the form of a continuous web 18 of distinct slender rods 20 of uniform cross section as shown and connected to each other in adjacent side by side relation by thin and narrow fins 22 formed integrally with said rods. Thus, although a plurality of thermoplastic rods are extruded simultaneously from the extrusion apparatus, they are held in definite side by side relation whereby subsequent operations in the process are facilitated and tangling or criss-crossing of the rods is prevented.

The web 18, consisting of the fin-connected rods 20, which issues from the extrusion apparatus in a heat-softened state, is cooled, in order to harden said rods and the connecting fins. For this purpose cold water may be used as the cooling agent. As here shown, web 18 is caused to travel longitudinally of a trough 24 containing the cooling water which flows continuously through the trough. Preferably water, which may be at room temperature, is constantly admitted into the trough through the inlet pipe 26, at the end of the trough remote from die plate 12, and is constantly exhausted through the outlet pipe 28 located at the opposite end of the trough.

After the web is cooled and thereby hardened or set, as distinguished from the soft or non-set condition of the web as it is extruded, said web is cut successively along transverse lines at the forward end thereof. The cutting operation is performed continually during the travel of the web, and concurrently as the web is formed by the extrusion machine. The cutting operation not only severs an end portion of the web from the body of the web but simultaneously results in the formation of a plurality of individual pellets from said severed end portion. More particularly, during each cutting operation, the thin portions or fins between the severed rod portions are broken so that said rod portions are separated from each other to form the individual pellets. One of these pellets is shown on an enlarged scale in Fig. 6 where it is indicated by the reference numeral 20a. As a result of the breaking of the fiins, during the cutting operation, as just described, small remnants or vestiges of the fins remain attached to the pellets and appear as small ribs 22a at two opposite corner edges of the pellets formed from the intermediate rods 20 of the webs and on one corner edge of the pellets formed from the rods 20 at the opposite side edges of the web. Thus the divided fin portions constitute parts of the pellets, since said portions remain attached to the pellets, respectively, and are therefore not wasted and are not distributed in the form of fines or small particles in the mass of pellets.

It will be understood that the pellets 20a may be of any suitable shape and of any practical size suitable for molding. The preferred shape is that of a cube as illustrated in Fig. 6, and the preferred dimension of the cube is ordinarily about one-eighth of one inch at each edge of the cube. Pellets of this size and shape are particularly well adapted for use in molding various plastic articles therefrom, as will be readily understood by those skilled in the art of plastics. The plastic material from which the pellets are formed, in accordance with the present invention may comprise organic derivatives of cellulose, polystyrene, polyvinyl chloride and its co-polymers, etc., and all other materials classified as thermoplastics in the art conventionally known as plastics. It will be understood that the thermoplastic material of the web may be such that it is normally hard, in various degrees of hardness depending upon the various thermoplastic materials of the normally hard type; or the thermoplastic material of the web may be such that it is normally soft and flexible, in various degrees, depending upon the various thermoplastic materials of the normally soft and flexible type. The fins or connecting portions 22 which hold the rods or strands 20 in fixed side by side relation in the web until the pelletizing or cutting operations are performed successively on the free end portion of the web, are very thin and narrow, being of the order of about .020 to .030 of one inch in thickness and about $\frac{1}{16}$ to $\frac{1}{8}$ of one inch in width. Although not limited thereto, the pellets produced in accordance with this invention are particularly advantageous for use in injection molding apparatus.

In Fig. 3, the die openings 14 are shown rectangular in outline to form the rods 20 of corresponding cross section, and said openings are arranged so that adjacent corners 30 of adjacent openings point toward each other. The slits 16 extend between and are in communication with adjacent openings 14 at said corners 30 thereof. Also, it will be noted that the row of openings 14 is along a curved line whereby to keep down the width of the die plate 12. It will be understood, however, that said openings 14 may be in a row in a straight line. When, as here shown, the openings 14 are arranged in a curved line, the web of fin-connected rods 20 is correspondingly curved transversely thereof as it issues from the die plate 12, but as soon as said web reaches the trough, at which time the web is still soft, it assumes the flat shape illustrated in Fig. 4.

The cooling of the web may take place entirely in the trough 24 but preferably as here shown the web 18 travels a distance after it leaves the trough and before it reaches the cutting or pelletizing station 32, so that the web is first cooled by the water treatment to a degree sufficient to solidify the web after which the web continues to cool and harden as it continues to travel to the pelletizing station at which the temperature of the web may be as high as 80° C. to 100° C., although it will be understood that the pelletizing or cutting operation may be performed when the web is at a lower temperature, say at room temperature.

In the apparatus illustrated in Fig. 1, the web passes from the trough 24 over a guide roller 34 onto a driven endless belt 36 to and between the driven draw rollers 38 which guide and feed the web continuously to the cutting device at the pelletizing station 32. Said cutting device may be of any suitable type but is preferably constituted by a rotary member 40 provided with a plurality of circumferentially spaced tangentially disposed cutting blades 42 which cooperate with the stationary cutting edge 44 formed on the table 46 on which the web 18 is supported as it leaves the rolls 38.

It will be understood that conveyor belt 36, rollers 38 and cutter 40 are driven in relatively timed relation to each other and to the operation of the screw or stuffer of the extrusion machine, so that as the web 18 issues from the extrusion machine it moves at uniform speed in the direction of its length from the extrusion machine to the pelletizing station. The conveyor belt 36 between trough 24 and rolls 38 serves to prevent excessive tension on the web in the movement thereof.

Thus, it is seen that the method of this invention comprises forming a continuous web containing a plurality of distinct rods or strips of thermoplastic material disposed in side by side relation and fixed or united with each other in said relation by comparatively weak portions provided in the web during the formation thereof, severing successive end portions of the web concurrently with the formation of the web, and simultaneously sub-dividing the severed portions of the web at said weak portions. It will be understood, however, that it is within the scope of the present invention to form lengths of the web and thereafter subject said webs to the pelletizing operation, instead of performing said operation concurrently with the formation of the web. Also, it will be understood that while in the preferred mode of practicing the invention as hereinbefore described, the web of connected rods or strips 20 are formed by extrusion, it is within the scope of this invention to form said web in any other suitable way which may occur to those skilled in the art in the light of the present disclosure.

As previously indicated herein, the rods may be of any suitable form in cross section. For example, and without limitation, said rods may be of cylindrical cross section as illustrated in Fig. 5A, or of triangular cross section as illustrated in Fig. 5B.

Finally, it will be understood that various changes may be made in the method and apparatus of the present invention without departing from the underlying idea or principles of the invention within the scope of the appended claims.

Having thus described my invention, what I claim and desire to secure by Letters Patent is:

1. The method of manufacturing moldable thermoplastic pellets which comprises forming from thermoplastic material a web containing a plurality of distinct slender strips or rods each of which is of uniform cross section longitudinally thereof, said rods extending longitudinally of the web and disposed in fixed side by side relation in the web laterally thereof, moving said web in the direction of its length concurrently with the formation of the web, and concurrently severing successive free transverse end portions of the web and simultaneously separating the parts of the severed strip or rod portions, respectively, to form individual pellets.

2. The method of manufacturing moldable thermoplastic pellets which comprises forming from thermoplastic a web containing a plurality of distinct slender strips or rods each of which is of uniform cross section longitudinally thereof, said rods extending longitudinally of the web and being connected to each other in adjacent side by side relation laterally of the web by intermediate comparatively weak fin-like portions of the web, and concurrently severing successive free transverse end portions of the web and simultaneously subdividing the severed portions of the web at the weak portions thereof to form a plurality of individual pellets from each of said severed portions of the web.

3. The method of manufacturing moldable thermoplastic pellets which comprises extruding a plurality of thermoplastic slender rods or strips in adjacent side by side relation, each of said rods being of uniform cross section and united with each other laterally thereof by intermediate comparatively weak portions of thermoplastic material extending longitudinally between adjacent strips, respectively, cooling said united thermoplastic rods and intermediate portions to harden them, and successively cutting said plurality of hardened rods, concurrently with the formation thereof along lines extending transversely of said rods and simultaneously breaking said weak portions at the cutting lines whereby to form during each cutting operation a plurality of individual pellets of thermoplastic material.

4. The method of manufacturing moldable thermoplastic pellets which comprises extruding a plurality of thermoplastic rods or strips in adjacent side by side relation, each of said rods being of uniform cross section and united with each other laterally thereof by intermediate comparatively weak portions of thermoplastic material extending longitudinally between adjacent strips, respectively, cooling said united thermoplastic rods and intermediate portions to harden them, moving said rods and intermediate portions as a unit in the direction of their length concurrently with the formation and cooling of the rods, and concurrently with the formation of said rods successively cutting said plurality of hardened rods along lines extending transversely of said rods and simultaneously breaking said weak portions at the cutting lines whereby to form during each cutting operation a plurality of individual pellets of thermoplastic material.

HERMAN GERING.

REFERENCES CITED

The following references are of record in the file of this patent:

UNITED STATES PATENTS

| Number | Name | Date |
|---|---|---|
| 551,306 | Converse | Dec. 10, 1895 |
| 1,738,665 | Ober | Dec. 10, 1929 |
| 1,839,699 | Parkhurst | Jan. 5, 1932 |
| 1,980,898 | Abernethy | Nov. 13, 1934 |
| 2,170,445 | Colbert | Aug. 22, 1939 |
| 2,410,035 | Luaces | Oct. 29, 1946 |

Disclaimer 2,464,746.—*Herman Gering*, Newark, N. J. METHOD OF MANUFACTURING THERMOPLASTIC PELLETS. Patent dated Mar. 15, 1949. Disclaimer filed Feb. 28, 1950, by the assignee, *Gering Products, Inc.*

Hereby enters this disclaimer to claims 1 and 2 of said patent.
[*Official Gazette April 11, 1950.*]